United States Patent [19]

Kuder

[11] 4,034,574

[45] July 12, 1977

[54] UNIVERSAL BALL AND SOCKET SWIVEL JOINT

[75] Inventor: Alfred W. Kuder, Placentia, Calif.

[73] Assignee: Frank A. Klaus, Fullerton, Calif.

[21] Appl. No.: 628,581

[22] Filed: Nov. 4, 1975

[51] Int. Cl.² .......................................... F16D 3/02
[52] U.S. Cl. .......................................... 64/7; 64/8; 64/2 P; 81/177 UJ; 81/57.12
[58] Field of Search ............... 64/8, 7, 9, 6, 2 P; 81/177 UJ, 57.12, 56, 55

[56] References Cited

U.S. PATENT DOCUMENTS

| | | | |
|---|---|---|---|
| 2,354,184 | 7/1944 | Daniel | 81/177 UJ |
| 2,381,102 | 8/1945 | Boyd | 64/7 |
| 2,680,358 | 9/1954 | Zublin | 64/2 P |
| 2,775,912 | 1/1957 | Skage | 81/177 UJ |
| 3,232,151 | 2/1966 | Blachowski | 81/177 UJ |

FOREIGN PATENT DOCUMENTS

| | | | |
|---|---|---|---|
| 654,264 | 4/1929 | France | 64/8 |

*Primary Examiner*—Samuel Scott
*Assistant Examiner*—Randall Heald
*Attorney, Agent, or Firm*—Raymond L. Madsen

[57] ABSTRACT

There is disclosed a universal or swivel joint having a ball member with an axis of rotation and a projection of substantially spherical shape centered on the axis, the surface of the projection containing a plurality of facets aligned with and uniformly and symmetrically positioned angularly around the axis of rotation, and a socket member having an axis of rotation and a receptacle centered on the axis which receptacle receives and mates with the ball member, the receptacle having an interior surface containing a plurality of facets aligned with and uniformly and symmetrically positioned angularly around the axis of rotation of the socket member, each of the facets of the receptacle mating with and being positioned in sliding engagement with a respective facet of the ball member. The universal ball and socket swivel joint may have a central opening therethrough symmetrically positioned about the axis of rotation of the ball member and the socket member into which another smaller ball and socket assembly substantially similar thereto may be coaxially aligned and located therein to form a dual independent coaxial universal swivel joint which may be connected to a coaxial drive fastener gun for driving a torque shear-bolt and nut assembly to angularly displace the coaxial drive axis of the fastener gun from the axis of rotation of the torque shear-bolt and nut.

6 Claims, 9 Drawing Figures

UNIVERSAL BALL AND SOCKET SWIVEL JOINT

THE DISCLOSURE

The present invention relates to universal or swivel joints and more particularly to a ball and socket universal or swivel joint and a coaxial ball and socket universal or swivel joint for coaxial drive torque shear-bolt and nut fastener guns.

In the field of building construction and framing, it has been the general practice to employ a rotary driven air tool and a spud wrench to tighten bolts and nuts which fasten the girders and beams of the building frame together, the spud wrench holding the head of a bolt while the air tool drives the nut thereon. Although such tools have served the purpose, they have not proved entirely satisfactory under all conditions in service for the reasons that considerable difficulty has been experienced in calibration of the air tool to control and maintain the required tightening torque and moving air hoses and compressors from one building location to another to operate the air tool and the requirement of two men to install a bolt and nut and the short life span of the air tool because of the constant impact and the extremely high noise level associated with the air tool.

To overcome these problems, a structural bolt was developed having a fluted torque-shear end on the threaded portion thereof and a coaxial fastener gun was developed to engage the fluted end of the bolt and the nut threadably engaged thereon to coaxially drive the bolt and nut together in counterrotation. The fluted end of the bolt is designed with a controlled torque groove circumferentially formed therearound at which groove the bolt shears when the desired torque has been reached. The coaxial fastener gun is designed to turn the nut and bolt against one another and when the bolt shears, the tightening or turning forces cease. Therefore, there is no tool calibration required since the bolt has the required shear torque determined by the groove in the fluted end thereof. Further, one man can operate the fastener gun since the drive is coaxial and applied to one side only of the nut and bolt assembly. Moreover, the fastener gun is electrically operated and there are no compressor and air hoses required. A quick visual inspection can insure that all bolts in the building structure have been tightened to proper tension, for either the fluted or splined shaft has been sheared off to indicate the bolt and nut have been driven to the correct torque, or the splined or fluted shaft remain on the bolt to indicate that the bolt and nut assembly has not been driven. Moreover, since the fastener gun is driven by an electric motor, there is no vibration or high impact noise which results in lower work output, fatigue, or in less bolts being driven per day.

One of the most critical problems confronting designers of coaxial driven fastener guns for driving controlled torque shear-bolts has been designing the gun to fit into a space where the axis of the coaxial drive can be aligned with the axis of the torque bolt and nut assembly. Many of the structural beams, such as "I" beams, have U-shaped channels with dimensions that do not permit or accommodate the length of the gun across the width channel to permit the gun to be aligned axially with the nut and bolt assembly. Those concerned with the development of coaxial drive fastener guns have long recognized the need for a way to accommodate a fastener gun to the width of narrow channel structural beams to drive torque shear bolts therein. The present invention overcomes this problem and fulfills this need.

The general purpose of this invention is to provide a counter-rotating coaxial drive fastener gun which embraces all the advantages of similarly employed fastener guns and possesses none of the aforedescribed disadvantages. To attain this, the present invention contemplates disadvantages. To attain this, the present invention contemplates a unique universal ball and socket swivel joint which can be connected to a coaxial counter-rotating drive of a fastener gun whereby the gun may be angularly offset from the axis of a bolt and nut assembly which it is driving to provide access to bolts and nuts located in narrow spaces and channels in structural beams and to drive them into correct torque engagement.

An object of the present invention is the provision of a universal ball and socket swivel joint which angularly displaces one axis of rotation into another axis of rotation.

Another object is to provide a dual coaxial universal swivel joint with two independently rotatable coaxial universal joints which angularly displaces one axis of coaxial rotation into another axis of coaxial rotation.

A further object of the invention is the provision of a dual coaxial universal ball and socket swivel joint which angularly displaces a counter-rotating coaxial drive about one axis from a counter-rotating axial drive about another axis.

Still another object is to provide a plurality of series or tandem connected universal ball and socket swivel joints by which the angle of displacement of one axis of rotation from another axis of rotation is increased over that which is realized with a single universal ball and socket swivel joint.

Yet another object of the present invention is the provision of a plurality of series or tandem connected dual coaxial universal swivel joints to convert a coaxial drive about one axis to a coaxial drive about another axis with an angular displacement greater than can be obtained from a single dual coaxial universal swivel joint.

A still further object of the present invention is to provide a dual coaxial universal swivel joint wherein an inner multi-faceted ball and socket swivel joint freely rotate coaxially within an outer multi-faceted ball and socket swivel joint to convert a counter-rotating coaxial drive about one axis of rotation to a counter rotating coaxial drive about another axis of rotation.

Other objects and many of the attendant advantages of this invention will be readily appreciated as the same becomes better understood by reference to the following detailed description when considered in connection with the accompanying drawings in which like reference numerals deisgnate like parts throughout the figures thereof and wherein.

Figure 1:
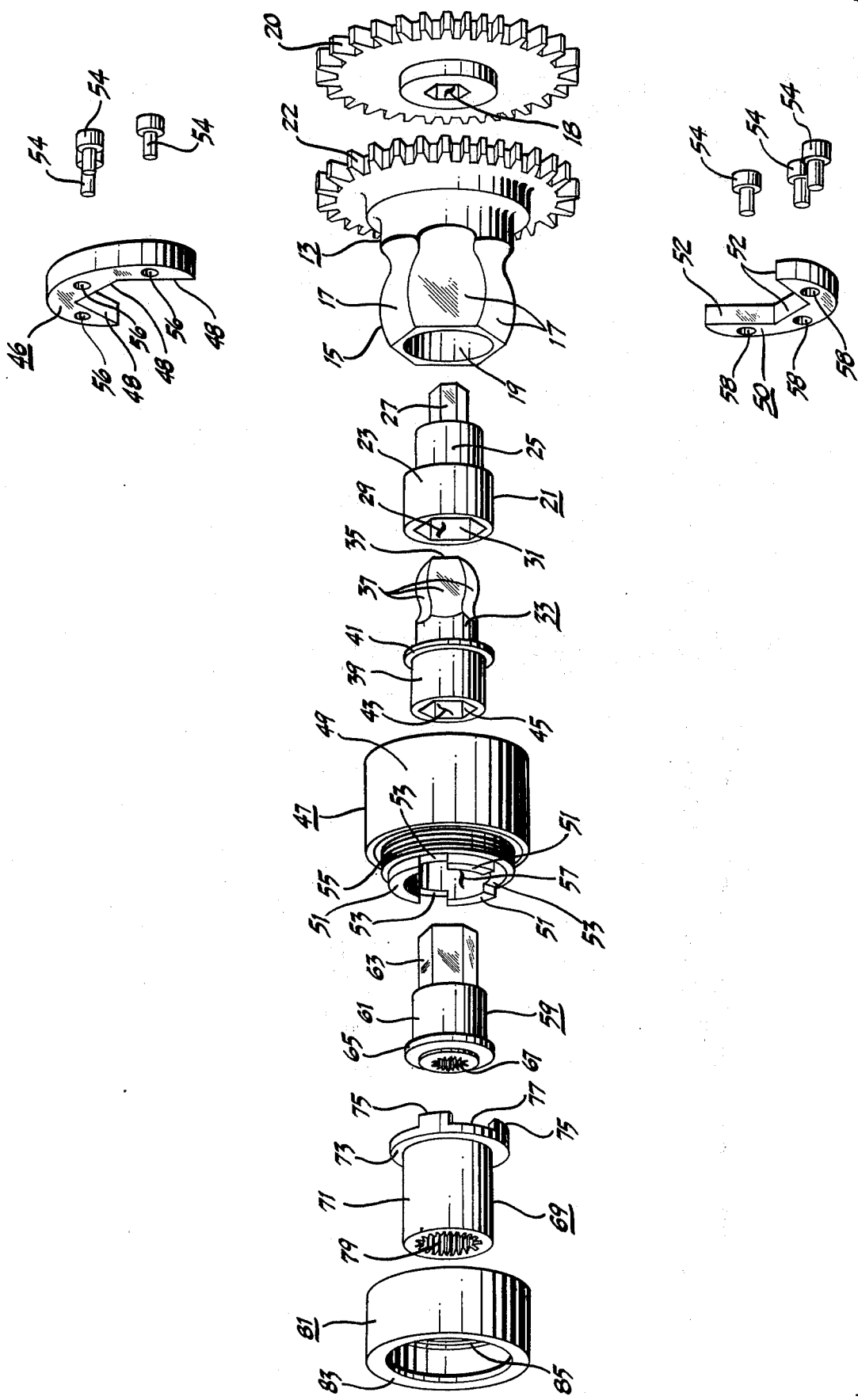
FIG. 1 shows an exploded perspective view of the dual coaxial multi-faceted ball and socket universal swivel joint of the invention.

Referring now to the drawings, wherein like reference characters designate like or corresponding parts throughout the several views, there is shown in FIG. 1 an outer ball member 13 having a substantially spherical outer ball joint 15 with a surface thereon containing a plurality of curved facets 17 uniformly and symmetrically positioned angularly around an axis of rotation which passes through the center of outer ball joint 15 and which is centrally located within a central opening or passage 19 passing through ball member 13. The other end of outer ball member 13 is integrally joined to an outer ball gear 22.

An inner socket member 21 has a first cylinder section 23 joined to a second cylinder section 25 which in turn is integrally connected to a multi-faceted drive shaft 27 which is adapted to engage an opening 18 in an inner ball socket gear 20. Cylinder section 23 has a receptacle or socket joint 29 with a substantially circular opening therein which has a plurality of facets uniformly and symmetrically positioned angularly around an axis of rotation which passes centrally through cylinder sections 23, 25 and drive shaft 27. Inner socket member 21 fits into opening 19 of outer ball member 13 and freely coaxially rotates therein.

An inner ball member 33 has a substantially spherical inner ball joint 35 at one end therein having a surface thereon containing a plurality of curved facets 37 aligned and uniformly and symmetrically positioned angularly about an axis of rotation passing centrally through inner ball member 33 and inner ball joint 35. The other end of inner ball member 33 has a cylinder section 39 integrally formed thereon with a shoulder or collar 41 around the circumference thereof separating cylinder section 39 from inner ball 35. Cyliner section 39 has a receptacle 43 therein containing an interior surface having a plurality of facet surfaces 45.

An outer socket member 47 has a main body comprising a cylinder section 49 having a central opening 57 therethrough, one end of cylinder section 49 (not visible) is adapted to receive outer ball joint 15 of outer ball member 13. This end of outer socket member 47 is also adapted to receive semi-circular outer ball clamps 46 and 50 which are assembled around outer ball 15 after it is inserted into cylinder section 49 to hold outer ball member 13 in engagement therein. The other end of cylinder section 49 has raised circular segments 51 alternating with depressed or recessed circular segments 53 disposed circularly around the end thereof. Adjacent circular raised segments 51 and circular depressed segments 53 is a threaded section 55 circumferentially disposed around cylinder section 49.

Semi-circular outer ball clamp 46 has curved or beveled surfaces 48 therein which engage curved facets 17 of outer ball joint 15. Similarly, semi-circular clamp 50 has curved or beveled surfaces 52 thereon which similarly engage curved facets 17 of outer ball 15. Semi-circular outer ball clamp 46 has bolt holes 56 therethrough and similarly semi-circular outer ball clamp 50 has bolt holes 58 therethrough which together receive bolts 54 which in turn are fastened into the end of cylinder section 49 of outer socket member 47.

An inner drive member 59 has a main body cylinder section 61 at one end thereof integrally joined to a multi-faceted shaft 63 at the other end thereof, which is adpated to engage receptacle 43 of inner ball member 33. Cylinder section 61 has a shoulder 65 adjacent the end thereof oppositely disposed from multi-faceted shaft 63. A fluted or multi-faceted opening 67 is centrally located through inner drive member 59 and is adapted to receive and mate with the fluted or multi-faceted end of a torque shear-bolt.

An outer drive member 69 has a main body cylinder section 71 having an end collar or shoulder 73 with raised segments 75 and depressed segments 77 which mate with and engage, respectively, depressed segments 53 and raised segments 51 of outer socket member 47. A multi-faceted or fluted opening 79 is centrally located in drive member 69 and is adapted to engage and mate with the corners or facets of a construction nut.

A cylindrical threaded collar nut 81 has a shoulder 83 at one end thereof and a threaded inner surface 85 at the other end therof and is adapted to secure outer drive member 69 in engagement with outer socket member 47.

Figure 2:
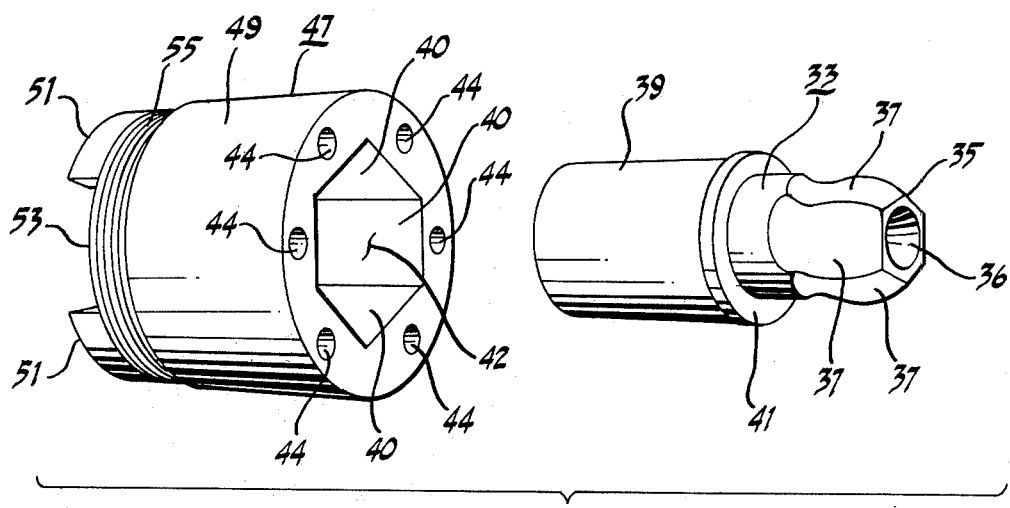
FIG. 2 illustrates an exploded view of the outer multi-faceted socket and the inner multi-faceted ball of the dual coaxial universal swivel joint of the invention.

Turning now to FIG. 2, there is illustrated a perspective exploded view of inner ball member 33 and outer socket member 47. Inner ball member 33 is shown with cylinder section 39 separated from inner ball joint 35 by collar 41. Inner ball joint 35 has facets 37 therearound. Inner ball member 33 has opening 36 centrally located therethrough along the axis of rotation and extending into receptacle 43 (not visible).

Outer socket member 47 has circular raised segments 51 alternating with circular depressed segments 33 at one end thereof, which are separated from cylinder section 49 by threaded section 55. The other end of circular section 49 has threaded bolt holes 44 therein which are adapted to receive bolts 54 to fasten semi-circular outer ball clamps 46 and 50 thereto. Outer socket member 47 has a concave opening or outer socket joint 42 centrally located therein and symmetrically positioned about the axis of rotation. Outer socket joint 42 has facet surfaces 40 which are aligned with and uniformly and symmetrically positioned angularly around the axis of rotation.

Figure 3:
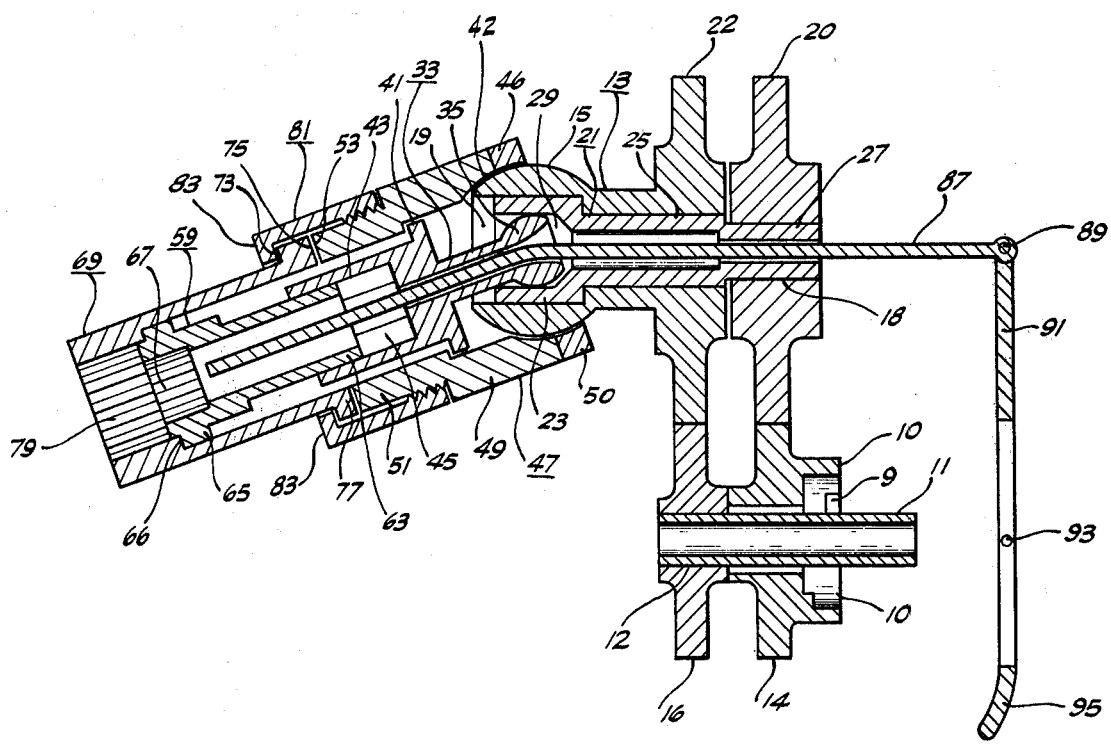
FIG. 3 illustrates a cross-section taken along the axis of rotation of a gear driven embodiment of the invention.

In FIG. 3, there is shown a cross-section of the embodiment illustrated in FIG. 1, further showing driving gears and a flexible "knock out" shaft. An inner ball-socket driving gear 14 has circular projecting segments 10 separated by circular depressed segments 9 for coupling to the outer rotating drive of a concentric coaxial drive fastener gun. A drive shaft 11 passes through a central opening in inner ball-socket driving gear 14 to fixedly engage an opening 12 in an outer ball-socket driving gear 16. Inner ball socket driving gear 14 engages inner ball-socket gear 20 having central opening 18 therethrough, which fixedly engages shaft 27 of inner socket member 21. Outer ball-socket driving gear 16 engages outer ball-socket gear 22 in which center cylinder section 25 of inner socket member 21 is located and freely rotates therein. Central opening 19 in outer ball member 13 receives cylinder section 23 of inner socket member 21, in free rotation therein. Inner socket joint 29 receives inner ball joint 35 in angular sliding engagement therein to form a universal swivel joint.

Outer ball joint 15 is engaged in outer socket joint 42 of outer socket member 47 and held, therein by outer ball semi-circular clamps 46 and 50, the multi-faceted surfaces of outer socket joint 42 engaging the multi-faceted surfaces of outer ball joint 15. Collar or shoulder 41 of inner ball member 33 engages a shoulder within outer socket member 47 to locate inner ball member 33 therein. Inner ball member 33 further has a drive receptacle 43 having a multiplicity of facets 45 therein which engage the multi-faceted surfaces of the faceted or fluted shaft section 63 of inner drive member 59. Collar 65 on inner drive member 59 engages shoulder 66 of outer drive member 69 to hold inner drive member 59 in rotary engagement interior with outer drive member 69.

Collar 83 of threaded cylindrical coupling collar or nut 81 engages shoulder 73 of outer drive member 69. Threaded coupling collar 81 is threadably engaged with outer socket member 47 and holds circular projecting segments 75 and depressed segments 77 of outer drive member 69 in rotary engagement with circular depressed segments 53 and projecting segments 51, respectively, of outer socket member 47.

Coincident with the rotating axis of outer ball member 13, inner socket member 21, inner ball member 33 and inner drive member 59, there is located a flexible shaft 87 which is pivotally coupled by a joint 89 to a pivot frame 91 which is rotated about a pivot pin 93 by means of trigger extension or projecting arm 95.

Figure 4:
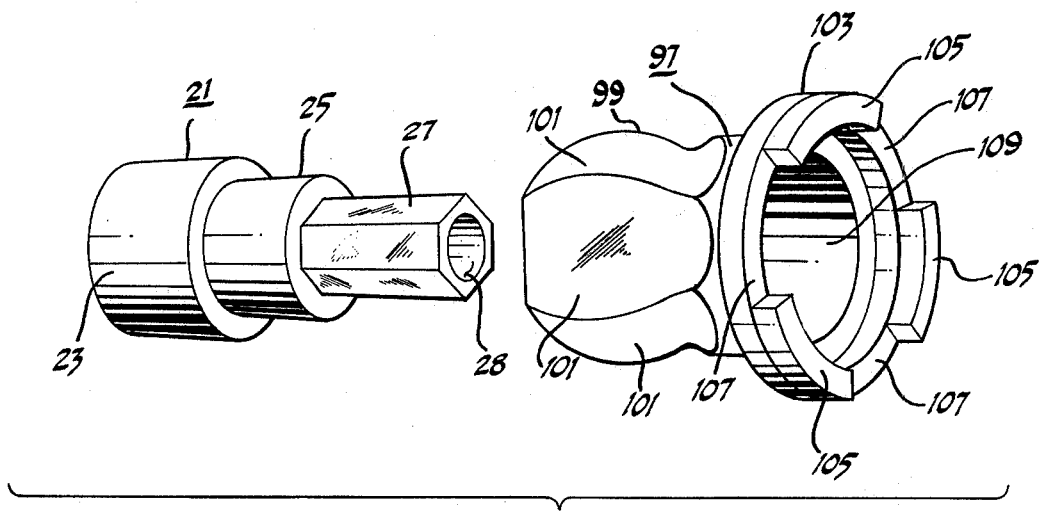
FIG. 4 shows an exploded perspective view of an alternate preferred embodiment of the inner socket member and the other multi-faceted ball member of the dual coaxial universal swivel joint of the invention.

Turning now to FIG. 4, there is illustrated a perspective exploded view of an alternate outer ball member 97 within which is centrally located about the rotating axis thereof, inner socket member 21. Alternate outer ball member 97 has outer ball joint 99 on one end thereof having a plurality of facets 101 on the surface thereof aligned with and uniformly and symmetrically positioned angularly around the axis of rotation. The other end of alternate outer ball member 97 has a collar 103 formed thereon having raised or projecting circular segments 105 interspersed with depressed or recessed circular segments 107 to provide a circular coupling mechanism to the outer drive coupling of a coaxial counter-rotating fastener gun. Inner socket member 21 with end cylinder section 23, middle cylinder section 25 and faceted or fluted shaft or projection 29 has a central opening 28 therethrough adapted to receive the "knock out" shaft of FIG. 3.

Figure 5:
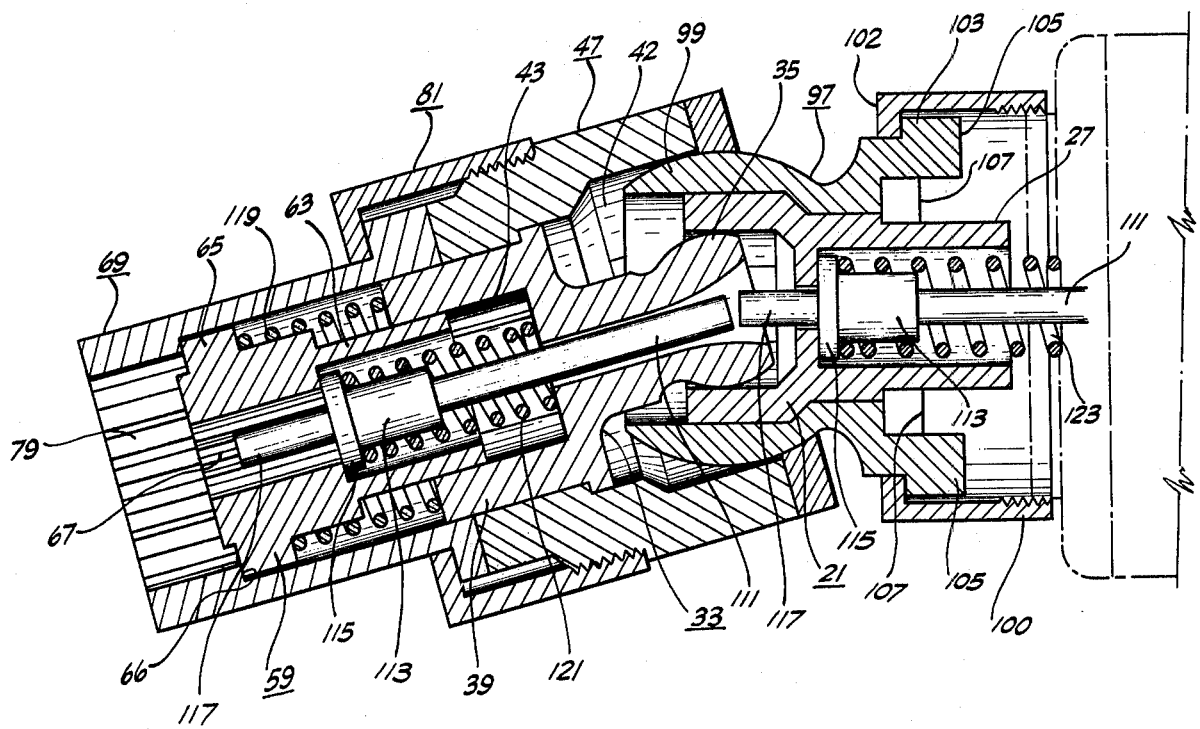
FIG. 5 illustrates a cross-section of a preferred embodiment of the invention utilizing the outer multi-faceted ball member of FIG. 4, taken through the axis of rotation.

FIG. 5 shows a cross-section view of the alternate outer ball member 97 cooperatively connected to its associated components. Inner socket member 21 is centrally located within alternate outer ball member 97 in independent rotary engagement therein. Shoulder 103 of alternate outer ball member 97 is engaged by a collar 102 of a coupling collar nut 100 which is adapted to threadably engage the end of a fastener gun. Raised circular projections 105 alternate with circular depressed segments 107 to form a circular coupling adapted to engage the outer drive mechanism of a coaxial counter-rotating drive of a fastener gun. Faceted or fluted drive shaft 27 of inner socket member 21 is adapted to engage the inner drive mechanism of a coaxial drive fastener gun.

A "knock out" member having an elongated shaft 111 is centrally located within inner socket member 21 along the axis of rotation thereof, shaft 111 having a cylinder section 113 with a collar 115 attached thereto and further has an end rod projection 117 extending therefrom. Collar 115 engages a shoulder within inner socket member 21 and is held in place therein by a spring 123.

An identical "knock out" member is located axially in the central opening of inner ball member 33. Collar 115 engages a shoulder within inner drive member 59 and is held in place thereagainst by spring 121. End projection of shaft projection 117 extends into the inner fluted or faceted bolt receptacle 67 of inner drive member 59. Receptacle 43 of cylinder section 39 of inner ball member 33 receives and engages the multi-faceted surfaces of faceted or fluted end shaft 63 of inner drive member 59.

Outer drive member 69 holds inner drive member 59 in rotary engagement therein by collar 65 of inner drive member 59 engaging shoulder 66 of outer drive member 69. Fluted or faceted nut receptacle 79 of outer drive member 69 engages the corners or surfaces of the nut threadably engaged on the torque shear-bolt, the fluted end of which bolt is engaged by inner fluted or faceted bolt receptacle opening 67 in inner drive member 59.

Figure 6:
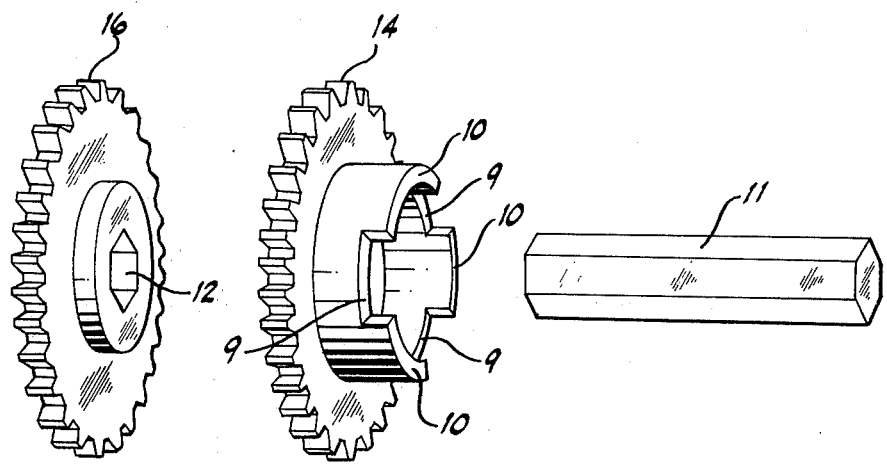
FIG. 6 illustrates an exploded view of the driving gear assembly for the embodiment of FIG. 1.

In FIG. 6, there is illustrated outer ball-socket driving gear 16 having a centrally located multi-faceted drive socket receptacle 12 therein. Inner ball-socket driving gear 14 has circular projecting segments 10 interspaced with circular recessed segments 9 to form a circular coupling mechanism to engage the outer drive mechanism of a coaxial counter-rotating fastener gun. A multi-faceted drive shaft 11 engages drive socket receptacle 12 of outer ball-socket driving gear 16 in fixed engagement therewith and connects to the inner drive mechanism of the fastener gun.

Figure 7:
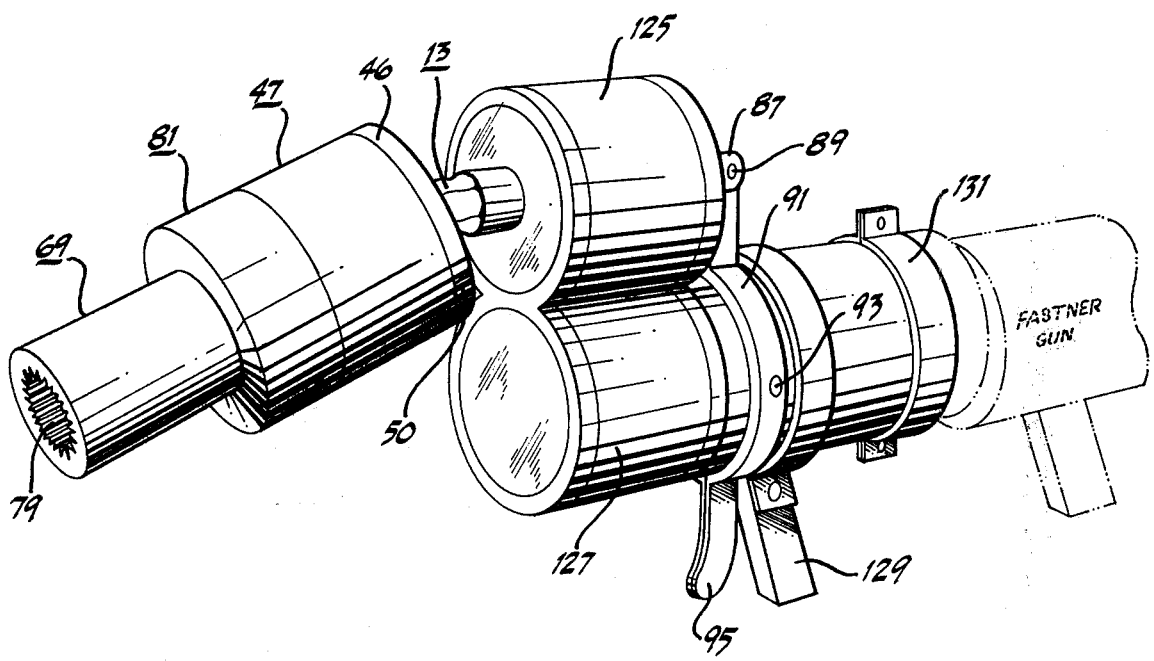
FIG. 7 illustrates the embodiment illustrated in FIG. 1 assembled on a counter-rotating coaxial fastener gun.

Directing the discussion now to FIG. 7, there is shown a perspective view of one embodiment of the invention attached to a fastener gun. Outer ball member 13 is engaged in outer socket member 47 and held in place therein by semi-circular outer ball clamps 46 and 50. Threaded coupling collar or nut 81 holds outer drive member 69 in rotary engagement with outer socket member 47. Fluted or multi-faceted opening 79 in outer drive member 69 is adapted to receive a nut threadably engaged on a torque shear-bolt.

Gear housing 125 contains inner ball-socket gear 20 and outer ball-socket gear 22. These two gears are respectively engaged by outer ball-socket driving gear 16 and inner ball-socket driving gear 14 which are in turn enclosed within driving gear housing 127. Flexible "knock out" shaft 87 is rotatably coupled by joint 89 of pivot frame 91 attached to the fastener gun adaptor case by pivot pin 93, the pivot frame being rotatably moved by trigger extension or arm projection 95. Handle 129 helps to stabilize the assembly by the operator when operated in conjunction with a fastener gun. Clamp 131 is utilized to assemble and fixedly clamp the coaxial universal or swivel joint assembly to an associated fastener gun.

Figure 8:
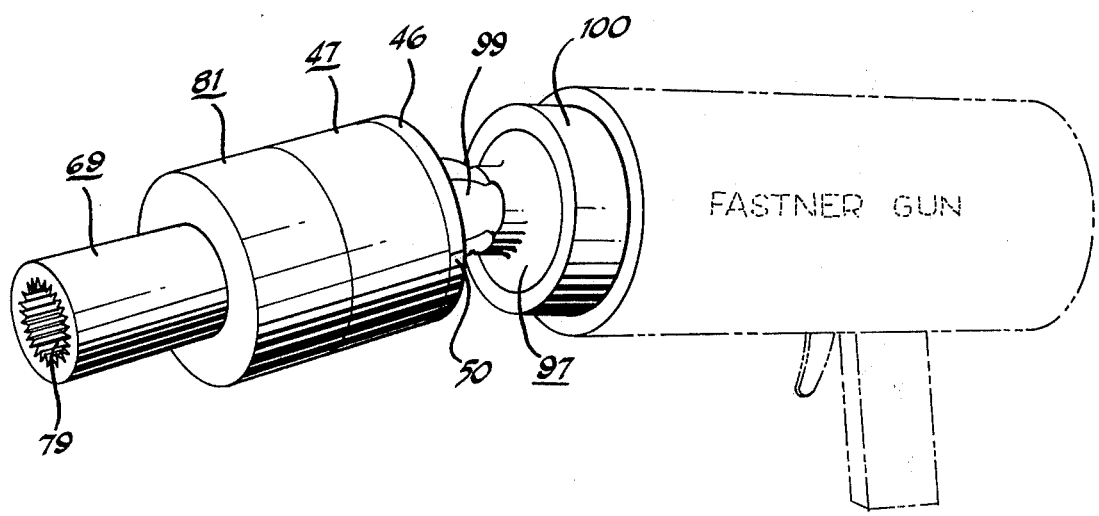
FIG. 8 shows a perspective view of the preferred embodiment illustrated in FIG. 5 coupled to a fastener gun.

Turning now to FIG. 8, there is illustrated therein a perspective view of a preferred embodiment of the present invention utilizing the alternate outer ball member 97 illustrated in FIG. 4. Alternate ball member 97 is engaged within outer socket member 47 and held in engagement therewith by semi-circular outer ball clamps 46 and 50. Threaded coupling collar nut 81 holds outer drive member 69 in rotating engagement with outer socket member 47. Fluted or faceted nut receptacle 79 in outer drive member 69 is adapted to receive and engage the corners and facets of a nut threadably engaged by a torque bolt. Alternate outer ball member 97 is held in rotating engagement with a fastener gun by coupling collar nut 100.

Figure 9:
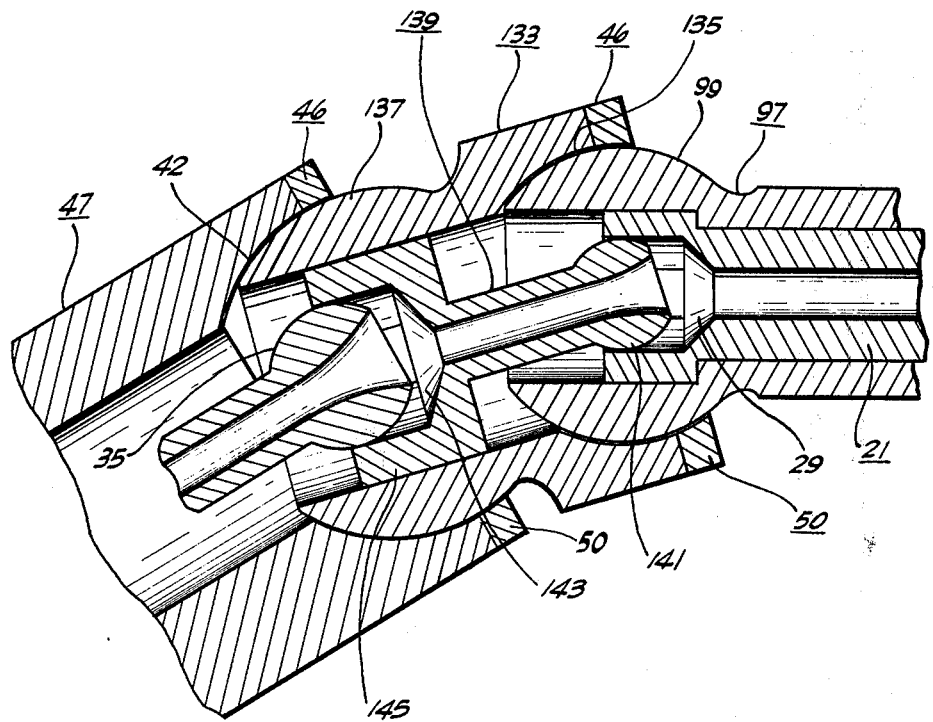
FIG. 9 illustrates dual coaxial universal swivel joints connected in tandem.

FIG. 9 illustrates a tandem or series connection of the coaxial universal swivel joint described herein. Alternate outer ball member 97 having outer ball joint 9 thereon is engaged by an outer ball and socket coupling member 133 having an outer ball coupling receptacle 135 therein. Outer ball and socket coupling member 133 further has a ball joint 137 integrally formed thereon which in turn is engaged by outer socket member 47 within outer socket joint 42. Clamps 46 and 50 hold outer ball joint 99 within outer ball coupling receptacle 135 and similarly, ball 137 within outer socket joint 42. An inner ball and socket coupling member 139 is engaged by inner socket member 21 within inner socket joint 29. Inner ball and socket coupling member 139 has a ball joint 141 on one end thereof and an inner ball coupling socket 145 on the other end thereof and is rotatably contained completely within outer ball and socket coupling member 133. Inner coupling ball joint 141 engages inner ball socket joint 29 of inner socket member 21. Inner ball coupling socket 145 has an inner ball coupling socket receptacle 143 which is engaged by inner ball joint 35.

Operation of the invention can best be described by first referring to FIG. 1 of the drawings. Inner ball socket drive shaft 27 engages opening 18 in inner ball socket gear 20. Inner socket member 21, including cylindrical sections 23 and 25 are completely rotatably located within opening 19 in outer ball member 13. Inner ball joint 35 with its multi-faceted surface 37 fits within inner ball socket joint 29 and mates with and engages the inner socket facets 31 therein. Therefore, the curved facets 37 slidably engage the facets 31 to form a universal swivel ball and socket joint.

Inner ball member drive receptacle 43 receives faceted or fluted end projection or drive shaft 63 of inner drive member 59.

Therefore, as gear 20 is turned, inner socket member 21 is rotated which in turn causes inner ball member 33 to rotate, which further rotates inner drive member 59, which further rotates a torque shear-bolt engaged by inner fluted or faceted bolt receptacle 67. Because of the engagement of inner ball joint 35 and inner socket joint 29, the axis of rotation of inner socket member 21 can be swivelled or offset from the axis of rotation of inner ball member 33 and inner drive member 59 coupled thereto.

It should be noted that the inner ball and socket members and connecting drive members freely and independently rotate within the central openings in outer ball member 13 and outer socket member 47.

Outer socket member 47 engages the faceted surfaces of outer ball joint 15 in a similar manner to that of inner ball joint 35 and inner socket joint 29. To hold the entire assembly together and to prevent outer socket member 47 from disengaging from ball joint 15, outer ball semi-circular clamps 46 and 50 hold ball 15 within outer socket member 47. The combination of projecting circular segments 51 and recessed circular segments 53 of outer socket member 47 engage and mate with corresponding projecting circular segments 75 and recessed circular segments 77 of outer drive member 69. Threaded cylindrical coupling collar 81 holds outer drive member 69 in mating engagement with outer socket member 47. Therefore, as gear 22 is rotated turning ball 15, outer socket member 47 is rotated which in turn turns or rotates outer drive member 69. Outer drive member 69 has fluted or faceted nut receptacle 79 therein to engage the nut of a torque nut and bolt assembly. Gear 22 is rotated in one direction while gear 20 is rotated in the opposite direction, therefore producing coaxial counter-rotating inner and outer drive members 59 and 69, respectively. By placing inner socket joint 29 within the central opening of outer ball joint 15, the inner ball and socket assembly and the outer ball and socket assembly pivot or swivel about the same center so that they function together to allow the axis of rotation of the inner and outer drive members 59 and 69, respectively, to be angularly offset from the axis of rotation of outer ball member 13 and inner socket member 21.

The entire assembly described above and its operation is further illustrated in FIG. 3 further showing inner ball socket gear 20 coupled to inner ball socket driving gear 14 which in turn is coupled to the outer coaxial drive of a counter-rotating coaxial drive fastener gun (not illustrated). Similarly, outer ball gear 22 engages outer ball driving gear 16 which in turn is rotated by drive shaft extension 11, which in turn is connected to the inner coaxial drive of a counter rotating coaxial drive fastener gun (not illustrated).

When inner fluted or faceted bolt receptacle 67 receives the end of a torque bolt and the end is twisted off when the bolt is driven to its correct torque, the end of the bolt sometimes sticks within bolt receptacle 67. To remove the end of the bolt remaining therein, flexible shaft 87 is driven through a central opening along the axis of each of the members comprising the dual coaxial counter rotating universal swivel joint. This shaft is operated by pivot frame 91 which is rotatably attached to pivot pin 93 to the assembly associated with the fastener gun. By pulling trigger 95, shaft 87 is driven against the sheared end of the torque bolt to force it outwardly from the bolt receptacle opening 67 to ready the gun for its next driving application. The assembly of the pivot frame on the lower gear set housing is illustrated in FIG. 7.

Instead of using a gear system to couple to a fastener gun, the dual coaxial universal swivel joint can be attached directly to the end of a fastener gun as illustrated in FIG. 5. Here alternate outer ball member 97 is utilized having a shoulder at one end thereof with raised circular segments 105 interleaved with depressed circular segments 107. These alternate raised and depressed circular segments engage the outer coaxial drive mechanism of the coaxial counter rotating fastener gun (not illustrated), to rotate alternate outer ball member 97. Inner socket member 21 has its multi-faceted or fluted drive shaft projection extending axially through alternate outer ball member 97 to engage the inner coaxial-drive mechanism of a counter rotating coaxial drive fastener gun (not illustrated) to rotate inner socket member 21. Outer ball joint 99 of outer ball member 97 is engaged within outer socket member 47 as herein described before. Similarly, outer socket member 47 is coupled to and engages outer drive member 69 as described in hereinbefore. Inner ball member 33 is engaged and rotated by inner socket member 21, which in turn rotates drive shaft end projection 63 of inner drive member 59, as described above in connection with FIG. 1.

FIG. 5 also shows an alternate method for providing a "knock out" of the sheared end of the torque bolt from bolt receptacle 67 of inner drive member 59. The "knock out" member has an elongated shaft 111 integrally joined with a cylinder section 113 having a shoulder 115 thereon from which projecting end 117 extends into bolt receptacle 67. A coil spring 121 between shoulder 115 and the rear surface of inner ball member drive receptacle 43 biases "knock out" member 111 with projecting end 117 fully into bolt receptacle 67. When bolt receptacle 67 engages the fluted end of a torque bolt, the bolt forces the projecting end 117 out of bolt receptacle 67 compressing spring 121. When the bolt end is sheared off, spring 121 forces the sheared end of the torque bolt out of bolt receptacle 67. Should the sheared end of the bolt stick or bind within bolt receptacle 67, an identical "knock out" member is provided within alternate outer ball member 97 and inner socket member 21, axially aligned therein. Similarly, a spring 123 biases identical "knock out" member within inner socket member 21 with shoulder 115 against a mating surface within inner socket member 21. Therefore, when the end of a torque bolt presses against protruding end 117 of the "knock out" member, it forces the "knock out" member within inner ball member 33 against the "knock out" member within inner socket member 21. If the sheared bolt end should jam within bolt receptacle 67, then the fastener gun "knock out" shaft can be used to press against the "knock out" member within inner socket member 21, which in turn presses against the "knock out" member within inner ball member 33 to force the sheared bolt end out of bolt receptacle 67. Regardless of the offset angle of the axis of rotation of inner drive member and outer drive member 59 and 69, respectively, from the axis of rotation of the fastener gun, the "knock out" members will always be operable in order to eject the sheared torque bolt end from bolt receptacle 67.

In order to obtain a larger angle of deviation between the axis of rotation of the fastener gun and the axis of rotation of the inner and outer drive members of the coaxial universal swivel joint, a tandem arrangement of a ball and socket assembly as illustrated in FIG. 9 may be utilized. Instead of joining ball member 99 within outer ball receptacle 42 within socket member 47, an outer ball and socket coupling member 133 may be used which couples ball 99 with outer ball receptacle 42. Similarly, the inner ball 35 may be coupled to inner ball receptacle 29 of inner socket member 21 by means of inner ball and socket coupling member 139. By utilization of inner and outer ball and socket coupling members 133 and 139 in coaxial combination, the angle of deviation between the axis of rotation of a fastener gun and the inner and outer drive members 59 and 69, respectively, may be doubled in magnitude. Therefore, this type of structure can be utilized to operate the gun in very small spaces that heretofore would be impossible to get into with the gun operating with its axis rotation aligned with the torque bolt and nut assembly.

The socket or receptacle 42 of outer socket member 47 is illustrated in the figures as having either curved or straight facets 40 therein (FIGS. 2, 3, 5 and 9). It should be understood that either configuration is possible and contemplated within the scope of the invention.

It now should be apparent that the present invention provides a mechanical arrangement which may be employed in conjunction with a coaxial fastener gun for angularly offsetting the axis of rotation of the inner and outer drive mechanism from the axis of rotation of the coaxial drive mechanism of the fastener gun itself.

Although particular components, etc., have been discussed in connection with a specific embodiment of a universal swivel joint constructed in accordance with the teachings of the present invention, others may be utilized. Furthermore, it will be understood that although an exemplary embodiment of the present invention has been disclosed and discussed, other applications and mechanical arrangements are possible and that the embodiments disclosed may be subjected to various changes, modifications and substitutions without necessarily departing from the spirit of the invention.

What is claimed is:
1. A first set of dual independent coaxial universal swivel joints, comprising:
an outer ball member having an axis of rotation and a projection of substantially spherical shape centered on said axis, the surface of said projection containing a plurality of facets aligned with and uniformly and symmetrically positioned angularly around said axis of rotation of said outer ball member, said outer ball member having a central opening therethrough symmetrical about said axis of rotation, said central opening being constructed and arranged to receive an inner socket member in coaxial rotary engagement therein;
an outer socket member having an axis of rotation and a central opening therethrough symmetrical about said axis of rotation, said central opening being constructed and arranged to receive an inner ball member in coaxial rotary engagement therein, one end of said central opening having a receptacle therein centered on said axis of rotation of said outer socket member which receives and mates with said projection of said outer ball member, said receptacle having a surface containing a plurality of facets aligned with and uniformly and symmetrically positioned angularly around said axis of rotation of said outer socket member, each of said facets of said receptacle of said outer socket member being positioned in sliding engagement with a respective facet of said projection of said outer ball member whereby rotation of one outer member rotates the other outer member independent of the relative angle between their respective axes of rotation thereby forming an outer universal swivel joint;
an inner ball member having an axis of rotation and a projection of substantially spherical shape centered on said axis, the surface of said projection containing a plurality of facets aligned with and uniformly and symmetrically positioned angularly around said axis of rotation of said inner ball member, said inner ball member being coaxially aligned and rotatably engaged in said central opening of said outer socket member with said projection of said inner ball member being positioned within said receptacle of said outer socket member; and
an inner socket member having an axis of rotation and a receptacle therein centered on said axis of rotation, said inner socket being coaxially aligned and rotatably engaged in said central opening in said outer ball member with said receptacle of said inner socket member being coaxially positioned within said projection of said outer ball member, said receptacle of said inner socket member receiving and mating with said projection of said inner ball member, said receptacle having a surface containing a plurality of facets aligned with and uniformly and symmetrically positioned angularly around said axis of rotation of said inner socket member, each of said facets of said receptacle of said inner socket member being positioned in sliding engagement with a respective facet of said projection of said inner ball member whereby rotation of one inner member rotates the other inner member independent of the relative angle between their respective axes of rotation and independent of the coaxial rotation of the outer members thereby forming dual independent coaxial universal swivel joints.

2. The universal joint described in claim 1 further including a fastener gun of the type having dual coaxial counter-rotating drive couplings, said dual coaxial counter-rotating drive couplings being connected to one end of said dual independent coaxial universal swivel joints such that said outer ball member and said outer socket member are rotated in one direction and said inner ball member and said inner socket member are rotated in the opposite direction by said fastener gun.

3. The universal joint described in claim 2 wherein the other end of said dual independent coaxial universal swivel joints opposite said one end attached to said fastener gun further include:
  a first fluted socket connected and rotated by said outer ball member and said outer socket member, said first fluted socket having a central opening therethrough along the axis of rotation and being adapted to receive and engage a nut threadably engaged on a bolt; and
  a second fluted socket located and coaxially aligned within said central opening of said first fluted socket, said second fluted socket being connected to and rotated by said inner ball member and said inner socket member and being adapted to receive and engage the fluted end of a bolt whereby said first fluted socket and said second fluted socket may engage and turn a nut and bolt, respectively, in threaded combination to advance the nut along the threads of the bolt.

4. The universal joint described in claim 1 further including a second set of dual independent coaxially universal swivel joints connected in tandum with said first set of dual independent coaxially universal swivel joints, said second set being substantially similar to said first set wherein said outer ball member and said outer socket member contain said inner ball member and inner socket member positioned in coaxial alignment therewithin, the outer ball and socket members of each set being coupled in series and the inner ball and socket members of each set being coupled in series and the inner ball and socket members of each set being connected in series to form dual series sets of dual independent coaxial universal swivel joints whereby an angle between the axes of rotation of the ends of said dual series sets may be obtained which is greater than the angle between the axes of rotation of the ends of a single set of dual independent coaxial universal swivel joints.

5. The universal joint described in claim 4 further including a fastener gun of the type having dual coaxial counter-rotating drive couplings, said dual coaxial drive couplings being connected to one end of said dual series sets of dual independent coaxial universal swivel joints in a manner such that the outer ball and outer socket members connected in series are rotated in one direction and the inner ball and inner socket members connected in series are rotated in the opposite direction.

6. In a fastener gun of the type having a dual coaxial counter rotating drive mechanism wherein an inner drive assembly counter rotates within a rotating outer drive assembly, the improvement comprising:
  a ball member, having an axis of rotation and a projection of substantially spherical shape centered on said axis, the surface of said projection containing a plurality of facets aligned with and uniformly and symmetrically positioned angularly around said axis of rotation of said ball member, said ball member having a central opening therethrough symmetrically centered about said axis of rotation;
  a socket member having an axis of rotation and a receptacle therein centered on said axis of rotation of said socket member which receives and mates with said projection of said ball member, said receptacle having a surface containing a plurality of facets aligned with and uniformly and symmetrically positioned around said axis of rotation of said socket member, each of said facets of said receptacle being positioned in sliding engagement with a respective facet of said projection of said ball member whereby rotation of one member about its axis of rotation is coupled to and rotates the other member independent of the relative angle between the two axes of rotation, said socket member having a central opening therethrough symmetrically centered about said axis of rotation of said socket member, the combination of said socket member coupled in rotary engagement with said ball member being adapted to mate with and engage the outer drive assembly of the fastener gun; and
  a ball and socket assembly substantially similar to said combination of said socket member in rotary engagement with said ball member, said ball and socket assembly being coaxially aligned and located within the central opening of said ball member and said socket member and being free to rotate independently therein thereby forming dual independent universal joints, said ball and socket assembly being adapted to mate with and engage the inner drive assembly of the fastener gun.

* * * * *